(12) United States Patent
Baldemair et al.

(10) Patent No.: US 12,047,323 B2
(45) Date of Patent: *Jul. 23, 2024

(54) CONTROL SIGNALING FOR RADIO ACCESS NETWORKS

(71) Applicant: Telefonaktiebolaget LM Ericsson (publ), Stockholm (SE)

(72) Inventors: Robert Baldemair, Solna (SE); Sorour Falahati, Stockholm (SE); Havish Koorapaty, Saratoga, CA (US); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,049

(22) Filed: Apr. 27, 2023

(65) Prior Publication Data

US 2023/0269054 A1 Aug. 24, 2023

Related U.S. Application Data

(63) Continuation of application No. 16/767,347, filed as application No. PCT/SE2017/051176 on Nov. 27, 2017, now Pat. No. 11,677,528.

(51) Int. Cl.
*H04L 5/00* (2006.01)
*H04L 1/00* (2006.01)

(52) U.S. Cl.
CPC ................. *H04L 5/0053* (2013.01)

(58) Field of Classification Search
CPC ... H04L 5/0053; H04L 1/1861; H04L 1/0026; H04L 5/0055; H04L 1/0027
See application file for complete search history.

(56) References Cited

U.S. PATENT DOCUMENTS 11,677,528 B2 * 6/2023 Baldemair ............ H04L 5/0057 370/329
2004/0183949 A1 9/2004 Lundberg et al.
(Continued)

FOREIGN PATENT DOCUMENTS

EP 2501072 A1 9/2012
WO 2016123372 A1 8/2016
(Continued)

OTHER PUBLICATIONS

3GPP TSG RAN WG1 Meeting#85, R1-183977 Title:PRS pattern enhancements fo rindor positioning (Year: 2016).*
(Continued)

*Primary Examiner* — Faruk Hamza
*Assistant Examiner* — Abusayeed M Haque
(74) *Attorney, Agent, or Firm* — Weisberg I.P. Law, P.A.

(57) ABSTRACT

A method of operating a signaling radio node in a radio access network is provided. The method includes transmitting control signaling to a feedback radio node. The control signaling includes control information having a bit pattern. The bit pattern has a subpattern with M bits in which the control information pertains to feedback signaling. A number M1 of the M bits of the subpattern is assigned to represent an assignment indication, and a number M2 of the M bits of the subpattern is assigned to represent a resource indication in which M1 and M2 are determined based on a size indication pertaining to the feedback signaling. The disclosure also pertains to related methods and devices.

20 Claims, 5 Drawing Sheets

(56) References Cited

U.S. PATENT DOCUMENTS

| | | |
|---|---|---|
| 2004/0204108 A1 | 10/2004 | Etkin et al. |
| 2011/0087934 A1 | 4/2011 | Yasui et al. |
| 2013/0176920 A1 | 7/2013 | Seo et al. |
| 2013/0336176 A1 | 12/2013 | Rubin et al. |
| 2015/0093074 A1 | 4/2015 | Rosenberg et al. |
| 2015/0173102 A1* | 6/2015 | Ruiz Delgado ....... H04L 1/1896 370/280 |
| 2016/0094744 A1 | 3/2016 | Yamamoto |
| 2016/0105493 A1 | 4/2016 | Bacher et al. |
| 2016/0191021 A1 | 6/2016 | Zhao et al. |
| 2017/0325072 A1 | 11/2017 | Ueki et al. |
| 2019/0058544 A1 | 2/2019 | Beale |
| 2020/0287691 A1* | 9/2020 | Baldemair ............ H04L 5/0055 |
| 2020/0372806 A1* | 11/2020 | Wang .................... G08G 5/0013 |
| 2020/0374043 A1* | 11/2020 | Lei ........................ H04L 1/1858 |
| 2020/0396029 A1* | 12/2020 | Baldemair ............ H04L 1/1854 |
| 2020/0412752 A1 | 12/2020 | Shapoury |
| 2021/0061471 A1 | 3/2021 | Bates et al. |
| 2021/0120537 A1* | 4/2021 | Lei ........................ H04L 1/1893 |
| 2021/0127323 A1* | 4/2021 | Yan ....................... H04W 56/00 |
| 2021/0152227 A1* | 5/2021 | Liu ....................... H04B 7/0628 |
| 2021/0167893 A1* | 6/2021 | Yan ........................... H04L 1/08 |

FOREIGN PATENT DOCUMENTS

| | | | | |
|---|---|---|---|---|
| WO | WO-2019098892 A1 * | 5/2019 | ........... | H04L 1/1854 |
| WO | WO-2019098893 A1 * | 5/2019 | ........... | H04L 1/0067 |

OTHER PUBLICATIONS

3GPP TSG-RAN WG1 Meeting#89, R1-1708633 Title: Used cases of multi-bit HARQ-ACK feedback (Year: 2017).*

International Search Report and Written Opinion dated Jul. 26, 2018 for International Application No. PCT/SE2017/051176 filed on Nov. 27, 2017, consisting of 12-pages.

3GPP TSG RAN WG1 NR#90bis R1-1718604; Title: On DCI formats, DCI content and the configurability of DCI fields in NR; Agenda Item: 7.3.1.4; Source: Nokia, Nokia Shanghai Bell; Document for: Discussion and Decision; Location and Date: Prague, CZ, Oct. 9, 2017, consisting of 4-pages.

3GPP TR 38.801 V2.0.0 3rd Generation Partnership Project; Technical Specification Group Radio Access Network; Study on New Radio Access Technology; Radio Access Architecture and Interfaces (Release 14); Mar. 2017, consisting of 90-pages.

* cited by examiner

CONTROL SIGNALING FOR RADIO ACCESS NETWORKS

CROSS-REFERENCE TO RELATED APPLICATIONS

This application is Continuation of U.S. application Ser. No. 16/767,347, filed on May 27, 2020, entitled "CONTROL SIGNALING FOR RADIO ACCESS NETWORKS," which is U.S. National Stage Patent Application of International Application Number: PCT/SE2017/051176, filed Nov. 27, 2017 entitled "CONTROL SIGNALING FOR RADIO ACCESS NETWORKS," the entireties of both of which are incorporated herein by reference.

TECHNICAL FIELD

This disclosure pertains to wireless or telecommunication communication technology, in particular to radio access technology, e.g. for mobile communication.

BACKGROUND

Currently, radio telecommunication technology of $5^{th}$ Generation is being developed, with the goal to serve a large variety of use cases. Accordingly, the related systems have to be very flexible, and new kinds of signaling and information may be required to be transmitted. However, flexibility in many cases incurs signaling overhead, which should be avoided or limited for good performance.

This is particularly relevant for acknowledgement signaling processes, which are used to ensure correct reception of transmitted data and thus are run in parallel to many transmissions.

SUMMARY

It is an object of this disclosure to provide approaches allowing flexible acknowledgement signaling with limited signaling overhead, in particular with limited overhead on dynamic control signaling. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. It should be noted that in the following, the terms data (sub) structure and data block (sub)structure may be considered to be used synonymously.

There is generally described a method of operating a signaling radio node and/or a signaling radio node arrangement in a radio access network. The method comprises transmitting control signaling to a feedback radio node, the control signaling comprising control information having a bit pattern. The bit pattern comprises a subpattern with M bits. The control information pertains to feedback signaling. Moreover, a number M1 of the M bits of the subpattern is assigned to represent an assignment indication, and a number M2 of the M bits of the subpattern is assigned to represent a resource indication, wherein M1 and M2 are determined based on a size indication pertaining to the feedback signaling.

Also, there is disclosed a signaling radio node and/or a signaling radio node arrangement for a radio access network. The signaling radio node or arrangement is adapted or configured for transmitting control signaling to a feedback radio node, the control signaling comprising control information having a bit pattern. The bit pattern comprises a subpattern with M bits. The control information pertains to feedback signaling. A number M1 of the M bits of the subpattern is assigned to represent an assignment indication, and a number M2 of the M bits of the subpattern is assigned to represent a resource indication, wherein M1 and M2 are determined based on a size indication pertaining to the feedback signaling. The signaling radio node, and/or the arrangement, may comprise, and/or be configured or adapted for utilising, processing circuitry and/or radio circuitry, in particular a transmitter and/or receiver and/or transceiver, for transmitting the control signaling and/or determining M1 and/or M2. Alternatively, or additionally, it may comprise a corresponding transmitting module and/or determining module.

Transmitting the control signaling may comprise, and/or be based on, determining and/or assigning the M1 and/or M2 bits, and/or determining the size indication.

Additionally, there is disclosed a method of operating a feedback radio node in a radio access network. The method comprises transmitting feedback signaling in response to received control signaling, the control signaling comprising control information having a bit pattern. The bit pattern comprises a subpattern with M bits. The control information pertains to feedback signaling. Moreover, a number M1 of the M bits of the subpattern is assigned to represent an assignment indication, and a number M2 of the M bits of the subpattern is assigned to represent a resource indication, wherein M1 and M2 are determined based on a size indication pertaining to the feedback signaling.

A feedback radio node for a radio access network is also disclosed. The feedback radio node is adapted or configured for transmitting feedback signaling in response to received control signaling, the control signaling comprising control information having a bit pattern, the bit pattern comprising a subpattern with M bits. The control information pertains to feedback signaling. Further, a number M1 of the M bits of the subpattern is assigned to represent an assignment indication, and a number M2 of the M bits of the subpattern is assigned to represent a resource indication, wherein M1 and M2 are determined based on a size indication pertaining to the feedback signaling. The feedback radio node may comprise, and/or be adapted or configured for utilising, processing circuitry and/or radio circuitry, in particular a transmitter and/or receiver and/or transceiver, for transmitting the feedback signaling and/or receiving the control information. Alternatively, or additionally, the feedback radio node may comprise a corresponding transmitting module and/or receiving module.

Transmitting the feedback signaling may comprise, and/or be based on, determining and/or assigning M1 and/or M2. Generally, M1 and M2 may be assigned and/or determined in complementary and/or analogous manner by the signaling radio node or arrangement and the feedback radio node, e.g. without being explicitly signaled. Both complementary sides may use an analogous manner to determine M1 and M2 based on a size indication.

Receiving control signaling may comprise receiving one or more control information messages. It may be considered that receiving control signaling comprises demodulating and/or decoding and/or detecting, e.g. blind detection of, one or more messages, in particular a message carried by the control signaling.

Control information pertaining to feedback signaling may trigger the feedback signaling, and/or provide information regarding the feedback signaling, e.g. for determining a codebook and/or indicating resources, and/or identifying subject transmission, e.g. implicitly or explicitly. The control information may in particular comprise a subpattern with bit fields allowing an assignment indication which may comprise a counter DAI and/or total DAI, and/or an (additional) resource indication like an ARI. The subpattern of M bits may comprise the assignment indication for large sizes (M2=0), and have M2>0 for small sizes.

A size indication may indicate a feedback size. The feedback size may in particular be represented in bit size. In some cases, the feedback size may be represented in number of subject transmissions and/or acknowledgement signaling processes for which feedback information is to be determined. The size indication may pertain to the feedback signaling transmitted and/or to be transmitted by the feedback radio node, e.g. in a single occasion and/or transmission and/or using one codebook or transmission format. The size indication may be indicated implicitly and/or explicitly. In some cases, the size indication may be indicated with a field in the control information, in particular in the M bits, e.g., in a field with less than M bits. In some variants, the size indication may be provided with a total DAI. Alternatively, or additionally, the size indication may be provided with a different control message, e.g. a RRC message and/or a control information message like an uplink grant (e.g., as an UL DAI) or command type message.

Transmitting feedback signaling in response to received control signaling may comprise determining a transmission format and/or codebook based on the control signaling, and/or transmitting on resources or a resource set indicated by the control signaling, and/or determining feedback information pertaining to subject transmission based on the control information of the control signaling, wherein the subject transmission may be indicated or referenced by the control information, or may be the control signaling itself. The codebook and/or transmission format may in particular be determined based on an assignment indication, or in some cases, by an absence thereof. The codebook may in particular a dynamically determined codebook, e.g. as determined based on counter DAI/s and/or total DAIs, and/or UL DAI, in particular if the feedback signaling is transmitted on a data channel like PUSCH.

M may generally be an integer number, in particular 2 or larger, e.g. a multiple of 2. M1 or M2 may be 0, or larger than 0. It may be considered that M1+M2=M. In some cases, one or more of the M1 bits may be assigned to the resource indication, and/or one or more of the M2 bits may be assigned to the assignment indication, e.g. with joint encoding, such that one or more bits may be assigned to both indications. The M bits of the subpattern may be consecutive, or distributed non-consecutive in the bit pattern. The M1 or M2 bits may be consecutive, or distributed non-consecutive in the bit pattern. A subpattern or indication may in general comprise one of more fields (bit fields), and/or values or parameters. Fields of a subpattern (or subpatterns/sub-subpatterns thereof) may be jointly encoded, or separately encoded. The bit pattern may represent the control information, which may be encoded and/or modulated and/or scrambled and/or spread and/or frequency-hopped or otherwise processed to produce the control signaling (or the reverse, to extract the control information). M1 may represent the number of bits corresponding to the number of different possible/representable options for assignments; M2 may represent the number of bits corresponding to the different number for resource options.

The bit pattern may comprise M, or more than M bits. In particular, the bit pattern may comprise M+R or more bits, wherein R may represent a number of bits of a (additional) resource indication, in particular an Assignment Resource Indication (ARI). This additional resource indication may be represented by a bit field or subpattern in addition to the subpattern with M bits. In some cases, the bits of such subpatterns or fields may be jointly encoded.

A resource indication may be considered an indication pointing to a resource structure, e.g. a resource structure for the feedback signaling. The resource structure may be a set of resource and/or resource pool and/or resource region, and/or specific resource/s. If the resource structure is larger than the resources required for the feedback signaling, in some cases the feedback radio node may be adapted to select a suitable resource from the resource structure. Generally, the feedback radio node may transmit feedback signaling on resources indicated, implicitly or explicitly, with control signaling, in particular a resource indication.

An assignment indication may generally indicate subject transmission and/or size of feedback expected, e.g. in bits, and/or a one or more structures or substructures for which feedback is expected or scheduled or indicated. Subject transmission may be a message and/or signaling on channel, e.g. on a shared data channel, or on a control channel. In some cases, the control signaling carrying the control information may be subject transmission.

It may generally be considered that an assignment indication comprises a counter downlink assignment indication and/or a total downlink assignment indication. Alternatively, the assignment indication/s may be for sidelink or backhaul link. The interpretation of the assignment indication may be dependent on the size indication, and/or which bits of the M bits are associated to the assignment indication may be dependent on the size indication.

According to approaches described herein, the subpattern of M bits may be interpreted differently based on the size thresholds, allowing flexible use of an e.g. fixed-sized sized subpattern, which may have the same size for a given control information message format, in particular a format of a scheduling assignment.

In particular, M1 and M2 may be determined based on a relation between the size indication and a size threshold. In particular, M2 may be zero if the size indication indicates a size of larger than a threshold, for example larger than 2. If the size indication indicates a size equal or smaller than such a threshold, e.g. 2 or less, M2 may be larger than zero, in particular equal to a number of bits of a counter DAI or total DAI or other assignment bit field.

It may generally be considered that, if the size indication indicates a feedback size of 2 or less for the feedback signaling, M2 is determined to be larger than 0. Other feedback sizes may be considered, e.g. 3 or 4.

Generally, it may be considered that more than one size threshold is defined, with M2 and/or M1 being different for the size indication indicating a size between (or below or above) different thresholds. M1 and M2 in this case may be monotonously changing, and/or M1+M2=M may be upheld.

It may be considered that the size indicated by the size indication refers to a number of bits of the feedback signaling, and/or a number of acknowledgement signaling processes and/or a number of data structures or substructures and/or a number of scheduled subject transmissions the feedback signaling pertains to. The number of bits may represent the codebook size for the feedback signaling.

In some variants, the control signaling may trigger the feedback signaling. Alternatively, or additionally, additional control signaling may trigger the feedback signaling, e.g. if it pertains to a plurality of different subject transmissions.

It may be considered that M2=0 if the size indication indicates a size over a size threshold, in particular a size threshold of 2 (e.g., bits or scheduling assignments counted).

The resource indication may indicate a resource pool and/or resources within the pool for transmission of the feedback signaling. In particular, for a size indicated to be equal or below a size threshold, the resource indication may indicate a pool (or set of resources) and may indicate on or more resources in the pool. It should be noted that resources and/or one or more pool may be configured, e.g. with higher layer signaling like RRC signaling and/or MAC signaling, and/or may be indexed or pointed to or selected with or based on the resource indication.

A bit pattern of the control information may comprise at least a second subpattern, wherein the second subpattern may comprise an acknowledgement resource indication, which may be expanded or expandable with M2>0. Expanding an acknowledgement resource indication may comprise providing more possible indications or indexes or pointers to resource structures, and/or a higher resolution (e.g. by pointing to one of a plurality of pools and to resources therein, instead of only pointing to one of a plurality of pools).

In general, different values for M2 may be determined for different size values indicated by the size indication. This may in particular be performed in the context of multiple thresholds, and/or based on an integer valued function.

Feedback signaling may in particular comprise, and/or consist of, acknowledgement signaling, and/or carry acknowledgement information. The feedback signaling may pertain to signaling scheduled by the control signaling, and/or to the control signaling itself, in particular if it is of command type. The feedback signaling may pertain to a plurality of subject transmission, which may be on different channels and/or carriers, and/or may comprise data signaling and/or control signaling. The feedback signaling may be based on a codebook, which may be based on one or more size indications and/or assignment indications, which may be received with a plurality of control signalings and/or control messages, e.g. in the same or different transmission timing structures, and/or in the same or different (target) sets of resources. Transmitting feedback signaling may comprise determining the codebook, e.g. based on control information in one or more control information messages. A codebook may pertain to feedback signaling at a single and/or specific instant, e.g. a single PUCCH or PUSCH transmission, and/or in one message or with jointly encoded and/or modulated feedback information.

It may be considered that control information may comprise information indicating the triggering of feedback signaling. Triggering feedback signaling may comprise indicating that feedback signaling should be transmitted, and/or indicating one or more resources and/or timing for feedback signaling, and/or indicating subject signaling or subject transmission to which the feedback signaling may pertain.

Control information may be considered to have a control information structure, which may be represented by the bit pattern. It may be considered that a control information structure like a bit pattern may indicate a size and/or content of control information, in particular the size of a bit pattern representing the control information. A control information structure may indicate the content and/or arrangement of bits in of the control information. In particular it may indicate a mapping of bits or subpatterns of bits of a bit pattern representing the control information to information and/or fields, and/or may indicate the function or meaning of bits or subpatterns.

Examples of assignment indications comprise a downlink assignment indication (DAI), counter DAI (also referred to as current DAI), total DAI, or command DAI or UL DAI, or combinations thereof, in particular a combination of counter DAI and total DAI. A DAI pertain to the feedback signaling, e.g. at one occasion and/or in one message. Generally, a DAI may represent a count or number of bits and/or subpatterns and/or data structures and/or substructures and/or messages and/or acknowledgement processes for which feedback or acknowledgement information or signaling is to be transmitted and/or pertains to. The DAI, e.g. a current DAI, may be a running count, e.g. counting the current number of the associated to the control information of the received signaling. A total DAI may indicate the total number for the feedback signaling. In some cases, a running or current DAI and a total DAI may be included in a substructure, or in two substructures of the control information structure. A current DAI and/or total DAI sometimes may be referred to as DL DAI. A command DAI may be considered an indication of an instructed size for feedback signaling, and in some cases, may be referred to as UL DAI. An UL DAI may be configurable, and in some variants, may be used for feedbacks signaling transmitted on resources for data signaling, e.g. on PUSCH. It may represent a number corresponding to a total DAI, or in some cases it may be different, e.g. larger. A larger command DAI may allow inclusion of additional information in feedback signaling, e.g. for measurement reporting and/or scheduling request and/or buffer status reporting, and/or for error coding. A smaller command DAI may for example indicate that acknowledgement signaling is to be bundled and/or concatenated, e.g. by combining (e.g., with logical AND) one or more subpatterns for different data substructures, e.g. code block groups, and/or by dropping one or more bits. In some variants, a total DAI may be a command DAI. It may be considered that in some versions control signaling carrying a scheduling grant or UL grant may comprise a command DAI. A scheduling assignment may comprise a current DAI and/or total DAI. However, other arrangements may be considered, such that different substructures may be associated to different types of control messages, and/or different sets.

The control signaling may represent and/or comprise a control information message, in particular a downlink or sidelink control information message, in particular a DCI or SCI message. The message may in particular be a fallback control message e.g. a fallback downlink control information message. A fallback control message may have fixed size, which may in some cases predefined, and/or not be configurable with control signaling, in particular higher layer signaling, e.g. RRC and/or MAC signaling. It may be considered that fallback messages for different sets of resources have different control information structures, in particular different (fixed) sizes. In some cases, a fallback control message for a set of target-specific resources (or one or more sets thereof) may comprise one or more assignment indication substructures and/or a size substructure more than a fallback control message for a set of common resources (or one or more sets thereof. In general, a control message like a fallback control information message (e.g., fallback DCI/SCI message) for a set of target-specific resources may be larger in size (e.g., number of bits) than a control message like a fallback control information message (e.g., fallback DCI/SCI message) for a set of common resources. The size may in particular represent a payload size. A total size, e.g. including payload/information bits, and optionally error coding bits, in particular error detection coding bits/CRC bits, may be larger as well, or the same or even smaller, depending on the error coding bits. It may be considered that for larger payload, a smaller number of coding bits is used, e.g. to ensure the same total size between different fallback DCIs.

In particular, the control signaling may represent and/or comprise a scheduling assignment or scheduling grant, and/or a message of corresponding control message type. However, in some cases, it may represent and/or comprise a command type control message.

Generally, the control information may be included in a control information message, which may be carried by the control signaling.

There is also disclosed a program product comprising instructions adapted for causing processing circuitry to control and/or perform a method as described herein.

Moreover, a carrier medium arrangement carrying and/or storing a program product as disclosed herein may be considered.

A feedback radio node may in particular be a user equipment or terminal. However, in some scenarios, e.g. backhaul or relay scenarios, a feedback radio node may be a network node, in particular a base station and/or gNodeB.

A signaling radio node may for example be a network node. However, in some scenarios, e.g. sidelink scenarios, the signaling radio node may be a user equipment or terminal. A signaling radio node arrangement may comprise one or more radio nodes, in particular network nodes, which may be of the same or different types. Different nodes of the arrangement may be adapted for, and/or provide, different functionalities described herein. In particular, different nodes may configure different codebooks, and/or different nodes may perform configuring and perceiving. A signaling radio node arrangement may in some variants represent a radio access network, and/or a heterogenous network (HetNet), and/or provide dual (or multiple) connectivity, e.g. comprising an anchor node and a booster node, and/or one or more of each or either. The radio nodes of a node arrangement may comprise suitable interfaces for communication between them, e.g. communication interfaces and/or corresponding circuitry.

Control information and/or control signaling carrying it or associated to it may be represented by control information message, in particular a physical layer message and/or DCI message and/or SCI message. A control information message may also be referred to as control message. For sidelink scenarios, instead of DAI/s, corresponding SAI/s may be generally considered.

Feedback signaling may be transmitted on resources, which may be scheduled and/or indicated and/or configured, e.g. in one or more resource pools, one of which may be selected or selectable with control information. Configuring the resources may be performed by a signaling radio node or arrangement, e.g. with higher-layer signaling like RRC and/or MAC signaling. The resources may be associated to a specific channel. Different resources or pools may be associated to different channels. Examples of such channels are PUSCH or PUCCH or PSCCH or PSSCH, or a URLLC channel in uplink or sidelink. The resources may pertain to slot-based or non-slot based (mini-slot) transmissions. Different resources may pertain to different transmission timing structures and/or timing types (slot-based or non-slot based).

An assignment indication may indicate one or more resource pools, which may be configured, and/or a resource or set or resources within a resource pool, for example depending on its resolution and/or number of bits.

Feedback signaling and/or associated information may generally be based on and/or pertain to a carrier and/or resource (in particular, time and/or frequency or subcarrier/s) or resource structure, and/or CORESET, and/or search space, and/or resource pool or region or set in which the control message is received, and/or based on the type of the control message. An indication of triggering may in particular indicate and/or configure a resource pool and/or resources and/or a channel and/or transmission format for feedback control information and/or feedback signaling, e.g. corresponding to an uplink or sidelink control channel like PUCCH or PSCCH or other (e.g., physical) channel, e.g. a PUSCH. An indication of carrier and/or resource and/or channel may indirectly or implicitly indicate a codebook, e.g. based on a one-to-one mapping of resource or resource structure or channel to codebook. Such a mapping may be configured or configurable, e.g. with higher layer signaling like RRC signaling and/or MAC signaling, or may be predefined. Alternatively, or additionally, the indication may indicate a transmission to be received, and/or resources on which a transmission has to be received, and/or a channel of such a transmission, and/or a transmission format and/or type, e.g. slot-based or non-slot based transmission. The corresponding control message may be a scheduling assignment. An indication may additionally, or alternatively, indicate one or more carriers, which may be carriers on which subject transmission may be scheduled, and/or which may be configured and/or activated, e.g. in a carrier aggregation.

Generally, a codebook may be selected based on resources scheduled for transmission of the feedback signaling, e.g. in a resource structure and/or resource pool and/or region or set. The resources may be associated to a channel, in particular a physical and/or control channel, for example PUCCH or PSCCH. The resources may be scheduled with control signaling, e.g. a control message like a DCI or SCI message, which may in some variants implicitly or explicitly indicate the association to a channel and/or transmission format. Scheduling the resources may be considered an example of configuring. Scheduling resources may comprise indication resources from a set of resources, which may be configured and/or configurable, in particular with higher layer control signaling, like RRC signaling and/or MAC signaling.

Independent, or in combination with other criteria, it may be considered that the codebook is selected based on subject transmission characteristics, e.g. resources used for the subject transmission, and/or channel, and/or number of layers, e.g. in MIMO scenarios, and/or transport block size, and/or retransmission status (e.g., number of retransmission of the current transport block or code block group).

In general, the codebook may be selected based on a format indicated for the feedback signaling, e.g. a transmission format. The transmission format may be indicated implicitly or explicitly. For example, a transmission format may be associated to a channel and/or resources, which may be indicated by a mapping. The mapping may in some variants be configured or configurable, e.g. with higher layer control signaling like RRC and/or MAC signaling, and/or be predefined. The transmission format may be indicated, e.g. configured and/or scheduled, with control signaling, in particular a control message, which may be physical layer signaling, and/or a DCI or SCI message. A transmission format may for example define a structure of a message comprising and/or carrying the feedback information, e.g. in terms of header information and/or additional information and/or MCS and/or duration and/or maximum number of bits, etc. In general, a transmission format may pertain to a specific channel, e.g. a physical and/or control channel like PUCCH or PSCCH. A transmission format in some examples may represent short or long transmission, e.g. short or long PUCCH or PSCCH, and/or a transmission of 2 bits or less, or larger than 2 bits.

In general, a subpattern of bits of the feedback information may pertain to control signaling or data signaling (as examples of subject transmissions), and/or an associated message and/or data structure or substructure, in particular a control message or transport block or code block group.

Different feedback codebooks may pertain to different carriers and/or different carrier arrangements and/or different types of signaling and/or different types of control signaling and/or different types of data signaling. A type may be related to the message type, and/or channel and/or format and/or resources associated to the signaling. A control message type may be distinguished between fixed-size message (which may for example be fallback control messages) and messages with configurable size. The size may be measured in bits and/or modulation symbols.

The approaches described herein allow flexible use of feedback with limited signaling overhead. In particular, it is possible to adapt interpretation of a given bit pattern or subpattern of control information according to operating conditions, e.g. number of subject transmission scheduled.

Feedback signaling, in particular acknowledgement signaling, may generally pertain to subject transmission. Subject transmission may be data signaling or control signaling. The transmission may be on a shared or dedicated channel. Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. Feedback based on reference signaling may comprise measurement information, e.g. CQI/CSI information and/or related information, which may be determined based on subject transmission comprising and/or representing reference signaling. A subject transmission may pertain to one scheduling assignment and/or one acknowledgement signaling process (e.g., according to identifier or subidentifier), and/or one subpattern of feedback signaling.

A feedback configuration may configure a HARQ or feedback codebook. A feedback codebook may in general be configured dynamically and/or semi-statically. Performing re-transmission may comprise transmitting the control information again, if it was not received correctly, e.g., according to the feedback. Such re-transmission may use a different transmission format or mode and/or MCS and/or error encoding than an earlier transmission. The number of transmission of specific control information may be counted, and in some cases, may be limited in number by a threshold, which may be predefined and/or configured or configurable. If the threshold is reached, retransmission may be stopped. It may be considered that performing retransmission comprises transmitting new control information and/or omitting retransmission of control information if correct reception is indicated by the feedback. A signaling radio node and/or arrangement may generally be adapted for performing re-transmission based on received feedback signaling, and/or perform such re-transmission.

Acknowledgement feedback may be transmitted based on a feedback codebook, e.g. a HARQ codebook. A codebook may indicate which bit/s of feedback pertain to which transmission and/or information and/or data structure (e.g., transport block or code block or code block group and/or message and/or signaling or transmission and/or process), e.g. indicating acknowledgment or non-acknowledgement, or non-transmission/reception.

It may be considered that transmitting the feedback signaling, in particular of acknowledgement feedback, is based on determining whether the subject transmission/s has or have been received correctly, e.g. based on error coding and/or reception quality. Reception quality may for example be based on a determined signal quality.

An indication may comprise one or more substructures and/or may be assigned one, two or more subpatterns or indicators. An indicator or subpattern may generally be represented as a bit field or subpattern, e.g. in a control information substructure. Control information may comprise an indicator like a downlink assignment indicator or index (DAI), which may indicate or count a number of data structures (like transport blocks and/or code blocks and/or code block groups and/or messages and/or control/command messages) for which acknowledgement feedback is scheduled and/or indicated, e.g. control feedback and/or other acknowledgement feedback. Different control messages, e.g. scheduling assignments, may comprise differently valued indicators, e.g. representing counts. A control message may optionally comprise a total number indicator, which may indicate a total number of data structures for which feedback is scheduled and/or indicated. Such an indicator may be referred to as total DAI. Alternatively, or additionally, a position indication and/or the indicator may indicate a count of bits scheduled and/or indicated for feedback, or a total number of bits, respectively. A count may pertain to a HARQ codebook, for example indicating where in the HARQ codebook a bit subpattern representing the feedback information for a data structure is to be located. It may be considered that for different types of data structures and/or channels and/or resource pools, different codebooks may be used. Feedback that is combined may be based on the same codebook. In some variants, a subpattern combination pertaining to control information may also pertain to data signaling, e.g. data signaling scheduled for reception, which may be scheduled by the control message carrying the control information. In such a case, there may be only one indicator, e.g. indicating one count, based on which the target radio node may include the subpattern in the codebook. The subpattern combination may comprise a subpattern indicating reception of the control information and a subpattern indicating reception of the data signaling, e.g., in a predefined or configured or configurable order. For example, the subpattern combination may comprise two bits, wherein one bit may indicate ACK/NACK for the control information, and the other ACK/NACK for the data signaling. Other orders, or different subpatterns may be considered. Subject transmission may in general comprise one or more messages, in particular one or more control messages, and/or one or more transmissions, e.g. pertaining to one or more channels, e.g. a data channel and/or a control channel. Such transmissions may be distributed over time, e.g. in different slots and/or mini-slots.

A system comprising a plurality of radio nodes as described herein, in particular a network node and one or more user equipments may be considered.

Acknowledgement or feedback information may represent and/or comprise one or more bits, in particular a pattern of bits. Multiple bits pertaining to a data structure or substructure or message like a control message may be considered a subpattern. The structure or arrangement of feedback or acknowledgement information may indicate the order, and/or meaning, and/or mapping, and/or pattern of bits (or subpatterns of bits) of the information. An acknowledgment configuration, in particular the feedback configuration, may indicate the size of, and/or arrangement and/or mapping of bits of, acknowledgement information carried by the acknowledgement signaling the configuration pertains to. Such a configuration may be referred to as codebook. The structure or mapping may in particular indicate one or more data block structures, e.g. code blocks and/or code block groups and/or transport blocks and/or messages, e.g. command messages, the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

A transmission format may generally indicate one or more data block structures or substructures for transmission or reception, and/or how a data block like a transport block (and/or a related structure) is divided, e.g. into subblocks or subblock groups, like code block/s and/or code block group/s. A transmission format may in some cases pertain to more than one data block, and/or may pertain to more than one acknowledgement signaling process. It may be considered that a transmission format indicates size in bits and/or coding for the one or more data block structures or substructures. A transmission format may pertain to signaling to be transmitted by a radio node, or to signaling to be received, and/or to acknowledgement signaling pertaining to signaling to be received. For different communication directions, and/or different carriers and/or bandwidth parts, and/or sets thereof, and/or different configurations, in particular different configurations of the set of acknowledgement configurations, different transmissions formats may be utilised, e.g. defined and/or configured. In particular, a transmission format for transmission on the transmission resources may be different from a transmission format associated to an acknowledgement configuration like the feedback configuration. Transmission formats may be independently configured from each other, e.g. using different messages and/or different signaling, e.g. on different layers of the protocol stack.

A feedback configuration, in particular a feedback codebook, may generally be a code block group configuration, which may indicate a mapping of one or more acknowledgement information subpatterns (e.g., one or more bits) to one or more code block groups, each of which may comprise or consist of the same or a different number of code blocks, in particular one or more code blocks. Each subpattern may be mapped to one code block group. In some variants, an acknowledgement configuration may indicate a mapping of one or more subpatterns to one or more transport blocks, each of which may comprise and/or consist of one or more code block groups. Each subpattern may be mapped to one transport block. An acknowledgement configuration may pertain to a combination of code block group/s and transport block/s, in particular regarding the structure or transmission format of corresponding acknowledgement information. An acknowledgement configuration may be considered to configure and/or format feedback or acknowledgement information pertaining to code block groups or transport blocks or code blocks.

A data block structure may correspond to a scheduled data block, e.g. for data signaling. The data blocks may be associated to separately scheduled transmissions, e.g. separate channels and/or instances and/or carriers and/or component carriers and/or data streams, e.g. in the context of carrier aggregation and/or multiple-antenna transmissions, e.g. MIMO (Multiple-Input, Multiple-Output). The data blocks and/or associated data signaling may be for downlink, or in some cases for sidelink. The feedback signaling, in particular acknowledgement signaling, may generally be uplink signaling, but in some variants, may be sidelink signaling. However, there may be considered cases in which data signaling is uplink signaling, e.g. in the context of retransmission performed by a user equipment. A subpattern may represent the acknowledgement information and/or feedback for the associated data block, e.g. with the size as indicated by an assignment indication. Different data blocks may be associated to different transmission instances and/or different acknowledgment signaling processes, e.g. HARQ processes. An acknowledgement signaling procedure may comprise one or more acknowledgement signaling processes, which may pertain to the same communication direction.

A data block structure (or, shorter, data structure) may generally represent, and/or be associated to, a scheduled data block and/or corresponding signaling. The data block may be scheduled for reception, e.g. by control signaling, in particular a control information message, which may be a scheduling assignment. In some cases, a scheduled data block may not be received, which may be reflected in the corresponding acknowledgement signaling. A number of data block structures, and/or the number of assignment indications, may be considered to represent a number of transmissions of data scheduled to be received by the user equipment (or second radio node).

A data block structure (also referred to as data structure) may generally represent, and/or correspond to, a data block, which may generally be a block of data and/or bits. A data block may for example be a transport block, code block, or code block group. It may be considered that a data block structure represents a data block which may be intended to be subjected to an acknowledgement signaling process. A data block may comprise one or more subblocks, which may be grouped into one or more subblock groups, e.g. code block groups. A data block may in particular be a transport block, which may comprise one or more code blocks and/or one or more code block groups. A data block structure may be considered to accordingly represent a transport block, code block or code block group. A subblock group like a code block group may comprise one or more subblocks, e.g. code blocks. It may be considered that a data block comprises one or more subblock groups, which may have the same or different sizes (e.g., in number of bits, e.g. systemic and/or coding bits). It may be considered that a data block comprises information bits or systematic bits (which may be considered to represent data to be transmitted and/or error detection bits) and/or coding bits, e.g. bits for error coding like error detection and/or in particular error correction coding, and/or parity or CRC (Cyclic Redundancy Check) bits. A subblock (e.g., code block) and/or subblock group (e.g., code block group) may analogously comprise systemic and/or coding bits. In some cases, systematic bits may be considered to comprise information and error detection bits determined based on the information bits. Parity bits may be considered to represent error correction coding bits. It should be noted that for a data structure (like a transport block) comprising one or more substructures (e.g., CBGs or code blocks), the systematic bits, and possibly parity bits, of the substructures may be considered information bits, based on which error detection coding and/or correction coding may be performed.

An acknowledgment signaling process may be a HARQ process, and/or be identified by a process identifier, e.g. a HARQ process identifier or subidentifier. Acknowledgement signaling and/or associated acknowledgement information may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgement information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, e.g. LDPC or polar coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

Generally, the feedback signaling, in particular acknowledgement signaling, may be signaling at one instance and/or in one transmission timing structure, and/or scheduled for common transmission and/or the acknowledgement information may be jointly encoded and/or modulated. The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

A radio node, in particular a signaling radio node, and/or a corresponding arrangement, may generally be adapted for scheduling data blocks or subject transmission for transmission and/or to provide and/or determine and/or configure associated assignment indications, which may include a total assignment indication. Configuring a feedback radio node or an UE may comprise such scheduling and/or associated determining and/or configuring and/or providing of the assignment indications. The signaling radio node, and/or a corresponding arrangement, may be adapted for, and/or perform, transmitting of subject transmission.

A resource structure may represent time and/or frequency and/or code resources. In particular, a resource structure may comprise a plurality of resource elements, and/or one or more resource blocks/PRBs.

Signaling may be considered to carry a message and/or information, if the message and/or information is represented in the (modulated) waveform of the signaling. In particular, extraction of a message and/or information may require demodulation and/or decoding of the signaling. Information may be considered to be included in a message if the message comprises a value and/or parameter and/or bit field and/or indication or indicator representing the information, or more than one or a combination thereof. Information included in such a message may be considered to be carried by the signaling carrying the message, and vice versa. A signaling characteristic, however, may pertain to a characteristic accessible without demodulation and/or decoding, and/or may be determined or determinable independent thereof. However, in some cases it may be considered that signaling is demodulated and/or decoded to determine whether the characteristic is associated to specific signaling, e.g. if the resources characterising the signaling actually belong to control signaling and/or to signaling intended for the responding radio node or user equipment. Also, in some cases, the characteristic may be provided as information in a message, in particular if the characterising signaling is not carrying the selection control message. Generally, selection of the resource structure may be based on one or more than one signaling characteristics. A signaling characteristic may in particular represent one or more resources, in particular in time domain, e.g. beginning and/or end and/or duration of the signaling, e.g., represented in symbol/s, and/or frequency range or resources of the signaling, e.g. represented in subcarrier/s, and/or numerology of the signaling, in particular of control signaling or data signaling like PDSCH signaling or PSSCH signaling. In some cases, the characteristic may indicate a message format, e.g. a format of the selection control message, for example an associated DCI or SCI format. It may generally be considered that a signaling characteristic represents and/or indicates a DCI format and/or search space (e.g., reception pool) and/or code, e.g. scrambling code, and/or an identity, e.g. one of different identities (like R-NTI or C-NTIs) assigned to the responding radio node or user equipment. Control signaling may be scrambled based on such identity.

Transmitting acknowledgment information/feedback and/or associated signaling on resources may comprise multiplexing acknowledgement information and data/data signaling on the transmission resources, e.g., for UCI on PUSCH scenarios. In general, transmitting acknowledgement information and/or feedback may comprise mapping the information to the transmission resources and/or modulation symbol/s, e.g. based on a modulation and coding scheme and/or transmission format. The acknowledgement information may be punctured or rate-matched. Acknowledgement information pertaining to different subject transmissions and/or acknowledgment signaling processes may be mapped differently. For example, acknowledgement information pertaining to late subject transmissions and/or having a size smaller than a threshold size (e.g., 3 or 2 bits) may be punctured, whereas acknowledgment information pertaining to earlier (non-late) subject transmissions and/or having a size equal to or larger than the threshold size may be rate-matched.

Feedback signaling, e.g. acknowledgement feedback, may generally be transmitted on resources and/or on a channel and/or according to a transmission format according to one or more configurations, which may for example be selectable based on one or more indications of control information, e.g. of the control message carrying the control information.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
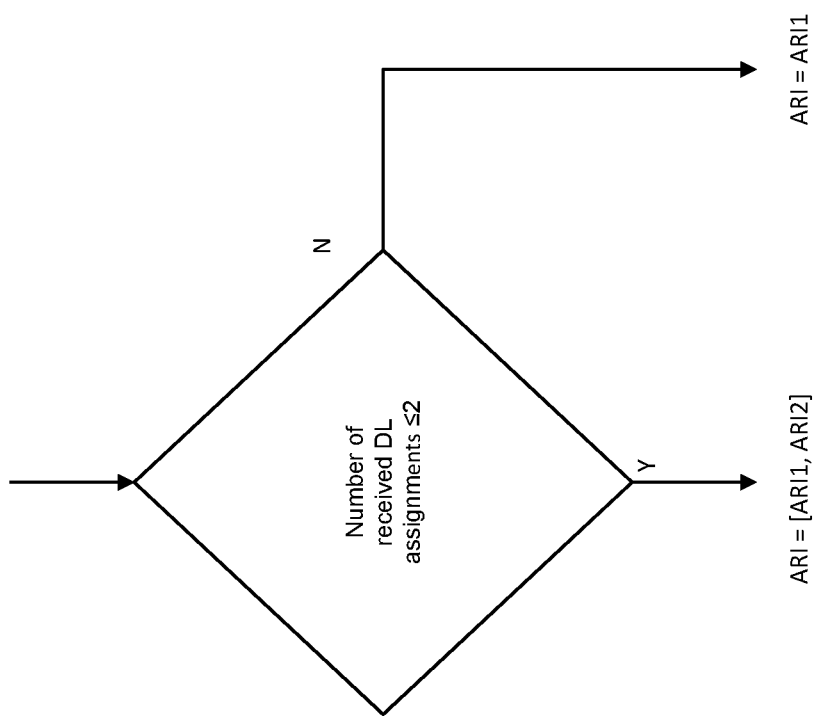
FIG. 1, showing an exemplary approach of repurposing assignment indication information for resource indication.

In the following, approaches are described for illustrative purposes in the context of NR RAT. However, they are generally applicable with other technologies. Also, communication in uplink and downlink between a signaling radio node like a network node and a feedback radio node like an UE is described by way of example. The approaches should not be construed to be limited to such communication, but can also be applied for sidelink or backhaul or relay communication. For ease of reference, in some cases it is referred to a channel to represent signaling or transmission on the channel. A PUSCH may represent uplink data signaling, a PDSCH downlink data signaling, a PDCCH downlink control signaling (in particular, one or more DCI messages like scheduling assignments or grants), a PUCCH uplink control signaling, in particular signaling of UCI. In some cases, UCI may be transmitted on PUSCH or associated resource instead of on PUCCH.

A carrier may be portioned into bandwidth parts (BWP). Bandwidth parts can have multiple usages. One of the envisioned usage scenarios is to enable multiple numerologies mixed in frequency-domain on the same carrier. A BWP configuration may indicate a set of frequency-domain resources, and an associate numerology. A UE can be configured with one or multiple BWP parts. DL and UL configurations (and/or SL configurations) may be are independent from each other. Typically, each BWP has its own associated CORESET for the scheduling DCI.

For NR, transmission of various control information from the UE to the network may be considered. Examples of such uplink control information (UCI) are hybrid-ARQ (HARQ) acknowledgements, channel-state information (CSI), and scheduling request (SR). The UCI can be transmitted on a separate control channel, PUCCH, occurring either at the end of the slot interval or during the slot interval, and/or be multiplexed with data and transmitted on PUSCH ("UCI on PUSCH").

There may be considered multiple formats defined for PUCCH that can be used to transmit control information as shown in the table below.

TABLE 1

Possible PUCCH format definitions

| PUCCH format | Number of symbols in a slot | Number of UCI bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH formats 0 and 2 are referred to as short PUCCH formats since they are transmitted only over 1 or two OFDM symbols in a slot. PUCCH formats 1, 3 and 4 are referred to as long PUCCH formats since they can be transmitted in up to 14 OFDM symbols (without slot aggregation) and even across multiple slots if PUCCH slot aggregation is configured. As shown in the table, each both long and short PUCCH formats are subdivided depending on the number of UCI bits they may contain.

A single slot may contain multiple transmissions of a single PUCCH format as well as multiple PUCCH formats which may or may not be transmitted by the same UE. For instance, a slot spanning 14 OFDM symbols may contain a long PUCCH spanning 12 OFDM symbols followed by a short PUCCH spanning two OFDM symbols.

Different PUCCH formats may be used for different purposes. The PUCCH formats that contain 2 bits or less can generally multiplex multiple UEs in the same time and frequency resources, with the long PUCCH being able to multiplex more users than the short PUCCH. PUCCH format 4 can multiplex multiple UEs with each UE having more than 2 bits.

A PUCCH resource that is used by a UE to transmit UCI may be defined by the physical resource blocks (PRBs), the OFDM symbols, the sequences along with their cyclic shifts and orthogonal cover codes (OCCs) used. It should be noted that OCCs, sequences and cyclic shifts are applicable only for some PUCCH formats.

In any given slot, the UE may have to transmit one or more of the following, e.g. triggered by control signaling received from the network.

HARQ acknowledgements (HARQ-ACK), and/or

Channel state information (CSI), and/or

Scheduling Requests (SR)

CSI information may be scheduled to be transmitted periodically, e.g., once every N slots, or aperiodically, e.g., triggered by DCI. SR may be transmitted by the UE when the UE has some data to be sent. HARQ-ACK information is transmitted to acknowledge whether subject signaling like PDSCH transmissions (or control signaling) in the downlink were successfully received or not. HARQ-ACK may consist of subpatterns like a single bit to acknowledge an entire transport block or multiple bits, each representing a code block group (CBG), i.e., a set of code blocks among the code blocks that comprise a transport block.

The PUCCH resource to be used for each of the different types of UCI can generally be controlled by the gNB. This can be done via explicit resource assignments either through semi-static configuration (RRC signaling) or through dynamic signaling with an ACK/NACK resource indicator (ARI) sent in downlink control information (DCI) messages.

In addition, the UE can also determine PUCCH resources implicitly. For example, the PUCCH resource can be determined based on the number of UCI bits to be transmitted in a slot. PUCCH resources for HARQ-ACK transmission for a scheduled PDSCH may also be determined implicitly by the control channel element (CCE) at which the received control channel message (PDCCH) scheduling the PDSCH begins. Such implicit resource determination can reduce the overhead incurred for dynamic signaling and help to avoid collisions between the PUCCH resources determined by different UEs for transmission of UCI.

In general, (acknowledgement) feedback may be considered to pertain to information or signaling or a message if is determined based on evaluating error coding included into the information and/or calculated for the information, and/or if it is adapted to indicate a reception status of the information or signaling or message, e.g. acknowledgement or non-acknowledgement; and/or if it based on measurements performed on the signaling.

UL and DL scheduling may be performed using DL assignments and UL grants sent in DCI messages. To enable scheduling flexibility, format and physical resources of a DCI message on PDCCH may vary. For example, there are different DCI formats containing different control information fields, which may have different payload sizes.

DCI can also be encoded at different coding rates (aggregation levels), resulting in a different number of coded bits (and thus resource elements) for a given payload size. The amount of resource elements (or more accurately, the amount of Control Channel Elements (CCE)) is varied to achieve simple link adaptation of the PDCCH, the number of CCEs a PDCCH is mapped to is called aggregation level. Exactly which CCEs are used for the transmission of a PDCCH can also vary. All possible CCE combinations (a combination is also called PDCCH candidate) a PDCCH of a given aggregation level can be mapped to is called a search space.

The UE may monitor a set of downlink resources for possible DCI transmission and, if a valid DCI is detected (e.g. a downlink assignment or an uplink grant or command type message), it follows the content of the DCI. The monitoring is known as blind decoding, in which the UE is trying, for different combinations of DCI sizes and formats, to decode a PDCCH candidate possibly containing valid DCI.

A UE can be configured with different search spaces (sets of resources) at different aggregation levels and can also be configured to monitor different DCI payloads. A search space is either common or target specific, e.g. UE or ID-specific. A first search space type may be used for messages common to many users, such as messages related to initial access and/or paging, but can sometime also be used for UE specific signaling. In a UE specific search space, the majority of UE specific Das will be sent.

A useful substructure/subpattern for some feedback signaling is an assignment indication substructure, e.g. for a DAI. The DAI is used to count DL assignments and determines the size of the HARQ codebook, and may for example comprise a current and/or total DAI in one or more substructures of fields Including a DL DAI in a DL assignment (control information message) enables more robust HARQ operation in case of frequent scheduling, since it enables a more robust HARQ codebook determination. If a UE determines a wrong HARQ codebook, the HARQ feedback is likely lost, reducing DL throughput.

The UL DAI may be used to determine the HARQ codebook size for UCI on PUSCH. For UCI on PUSCH, if the HARQ codebook size is wrongly determined, this leads to lost HARQ feedback but also to lost UL transmissions if the HARQ feedback is >2 bit (in this case PUSCH may be rate matched around coded ACK/NACK, and a wrong assumption on the HARQ codebook size leads to a wrong PUSCH de-mapping). If fallback DCI is used in UE specific search space for regular scheduling, simultaneous transmission of UL-SCH data and UCI as UCI on PUSCH is not uncommon, therefore it is undesirable not to have UL DAI to protect against wrong HARQ codebook sizes. PUCCH can carry UCI, e.g. ACK/NACK (or more generally, feedback related to HARQ), measurement information like CQI/CSI, SR, or beam related information. NR defines a variety of different PUCCH formats, which can be grouped into short and long PUCCH formats.

Short PUCCH comes in flavors for =2 bit and >2 bit. Short PUCCH can be configured at any symbols within a slot. While for slot-based transmissions short PUCCH towards the end of a slot interval is the typical configuration, PUCCH resources distributed over or early within a slot interval can be used for scheduling request or PUCCH signaling in response to mini-slots.

PUCCH for =2 bit uses sequence selection. In sequence selection the input bit(s) selects one of the available sequences and the input information is presented by the selected sequence; e.g. for 1 bit 2 sequences are required, for 2 bit, 4 sequences. This PUCCH can either span 1 or 2 symbols, in case of 2 symbols the same information is transmitted in a second symbol, potentially with another set of sequences (sequence hopping to randomize interference) and at another frequency (to achieve frequency-diversity).

PUCCH for >2 bit uses 1 or 2 symbols. In case of 1 symbol, DM-RS and UCI payload carrying subcarriers are interleaved. The UCI payload is prior mapping to subcarriers encoded (either using Reed Muller codes or Polar codes, depending on the payload). In case of 2 symbols, the encoded UCI payload is mapped to both symbols. For the 2-symbol PUCCH, typically the code rate is halved (in two symbols twice as many coded bits are available) and the second symbol is transmitted at a different frequency (to achieve frequency-diversity).

Long PUCCH coms in the two flavors=2 bit and >2 bit. Both variants exist with variable length ranging from 4 to 14 symbols in a slot, and can be aggregated across multiple slots. Long PUCCH can occur at multiple positions within a slot with more or less possible placements depending on the PUCCH length. Long PUCCH can be configured with or without frequency-hopping.

Long PUCCH for >2 bit uses TDM between DM-RS and UCI-carrying symbols. UCI payload is encoded (either using Reed Muller codes or Polar codes, depending on the payload), mapped to modulation symbols (typically QPSK or pi/2 BPSK), DFT-precoded to reduce PAPR, and mapped to allocated subcarriers for OFDM transmission.

Figure 2:
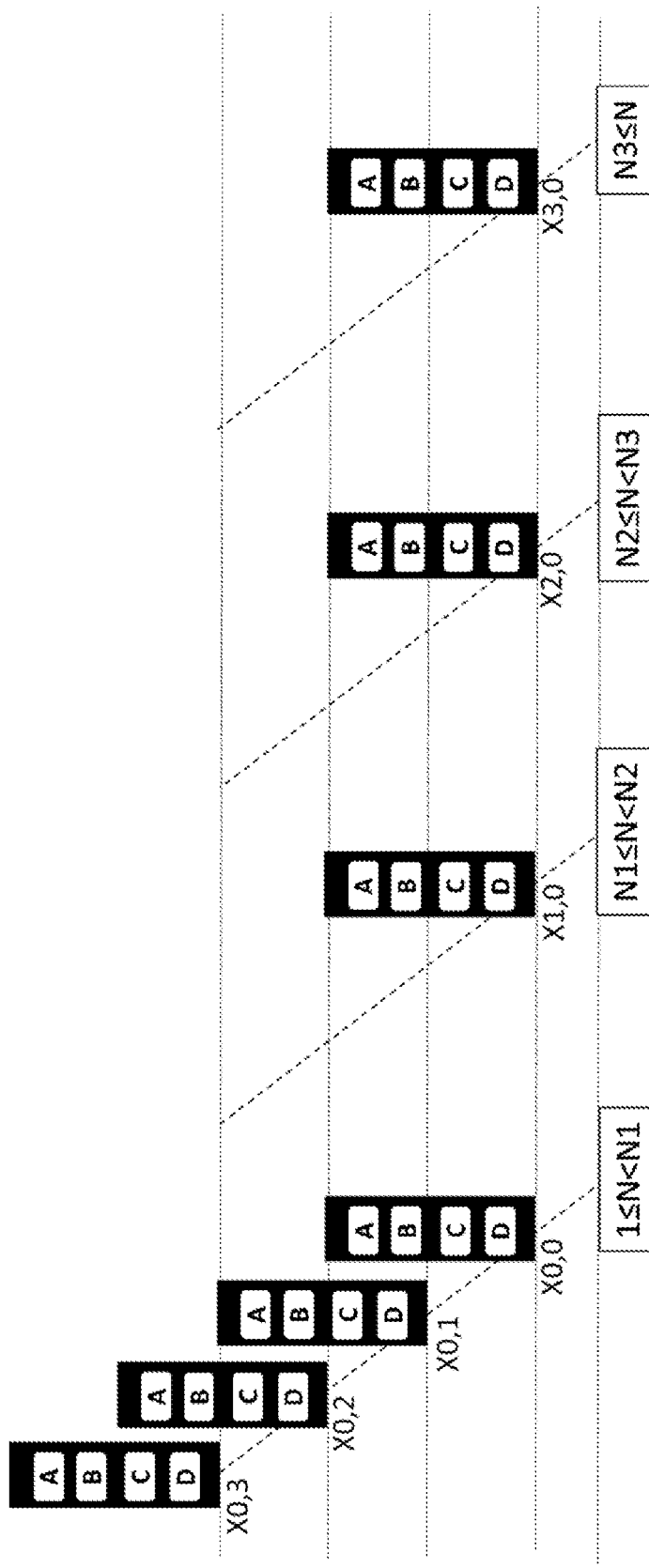
FIG. 2, showing an example of interpreting a resource indication like ARI based on a size for feedback signaling.

A UE can be configured with multiple PUCCH formats, of the same or different type. Small payload PUCCH formats may be needed if a UE is scheduled only with 1 or 2 DL assignments while a large payload format is needed if the UE is scheduled with multiple DL assignments. Long PUCCH formats are also needed for better coverage. A UE could for example be configured with a short PUCCH for =2 bit and a long PUCCH for >2 bit. A UE in very good coverage could even use a short PUCCH format for >2 bit while a UE in less good coverage requires even for =2 bit a long PUCCH format. FIG. 2 depicts an example of PUCCH formats configured to a UE. P0 to P4 correspond to different PUCCH resources for short PUCCH, P5 to P8 to PUCCH resources for long PUCCH. Between the PUCCH resources, signaling on PUSCH or other signaling, or no signaling may be scheduled. Resources may overlap, as indicated with P4. Depending on which resource is indicate for PUCCH transmission and/or the feedback signaling, a codebook may be selected for transmission.

NR supports dynamic indication of PUCCH resource and time. A HARQ codebook carried by PUCCH can contain HARQ feedback from multiple subject transmissions, e.g. PDSCH (from multiple time instances and/or component carriers) and/or one or more PDCCH. The PUCCH resource and time may be indicated in the scheduling DL assignment in case of a dynamic scheduled subject transmission representing data signaling. The association between PDSCH and PUCCH can be based on the PUCCH resource (PR) and time indicated in the scheduling DCI ($\Delta T$). It may be considered that feedback like HARQ feedback for subject transmissions like PDSCHs (data signaling) and/or control signaling, which is scheduled for transmission on the same resource and/or time, may be reported together based on the same codebook. The codebook may e.g. be selected based on the resource and/or time and/or channel of transmission, and/or of reception and/or type of subject transmission/s.

The latest subject transmission like PDSCH that can be included may be limited by the processing time the UE needs to prepare HARQ feedback.

To avoid wrong HARQ codebook sizes and wrong indexing into the HARQ codebook, a DAI may be included in each DL assignment that counts DL assignments up to (including) the current DL assignment. A counter and a total DAI may be provided, for example for a case of carrier aggregation.

In NR, a carrier can support slot-based transmissions and non-slot-based transmissions (mini-slots). For slot-based transmissions, a UE might be configured with CBG. For non-slot-based transmission a CBG configuration might be less useful, especially if the transmissions are short (one or few code blocks). Also, if a UE is scheduled with fallback DCI, it may in some cases not use a CBG configuration. If a UE is scheduled with a non-slot-based transmission (e.g., to provide low latency), the gNB is likely to request early HARQ feedback to determine if a transmission has been successful. This can be done by indicating a different PUCCH resource than that one used for other ongoing transmissions. In such cases, a set of feedback configurations to select from may be advantageous.

A UE may be configured with multiple Radio Network Temporary Identifiers (RNTI). The CRC of a DCI is scrambled with the RNTI: The UE decodes a DCI, determines the CRC, and compares the determined CRC with the de-scrambled received CRC and if it matched the UE knows the DCI was intended for it. DL assignments received with differently scrambled DCI can be mapped to different HARQ codebook configurations. Note that multiple RNTI can point to the same HARQ codebook configuration. An indication of the codebook to be selected may be represented by such use of RNTI.

In NR, a UE can be configured with multiple bandwidth parts. A HARQ codebook configuration can be associated with a bandwidth part, and depending on the bandwidth part of the transmission, a different HARQ codebook configuration may be used. Different bandwidth parts can be configured with different numerologies, i.e. also a numerology can be associated with a HARQ codebook configuration and depending which numerology is used for PDCCH and/or PDSCH a certain HARQ codebook configuration is selected. Several bandwidth parts/numerologies can point to the same HARQ codebook configuration.

NR supports multiple PUCCH/Cell groups. A PUCCH group is a set of DL component carriers together with an UL component carrier which is used for HARQ feedback of the DL carriers in the group. Different PUCCH groups can be associated with different HARQ codebook configurations, especially dynamic vs. semi-statically configured HARQ codebook.

Since the gNB is generally aware of the number of bits to be transmitted by the UE, or which resources to expect autonomous transmissions by the UE such as SR, the gNB is aware of the resources on which all the UCI information must be received. There are certain error cases where a mismatch can occur between the UE and the gNB on the resources to be used for PUCCH transmission, e.g., when certain downlink assignments for PDSCH are missed by the UE. However, such mismatches occur with a very small probability and can sometimes be handled either by the gNB performing decoding on multiple hypothesized PUCCH resources.

With a small number of ARI bits (e.g. 2) the number of PUCCH resources that can be selected can be too small. This may especially be a problem for small HARQ feedback bit sizes: Multiple UEs might be scheduled simultaneously, each UE is only scheduled with one/few DL assignments (e.g. VoIP), requiring only few HARQ bits. If many UEs are scheduled simultaneously, it can be limiting to be only able to select from 4 PUCCH resources.

If a UE, for example, is configured with HARQ codebook requiring multiple DL DAI fields (e.g. total DAI, counter DAI) in DCI but only receives DL assignments worth 1 or 2 HARQ feedback bits, two DAI fields (representing an assignment indication comprising the two fields) are not needed. However, for simplicity of blind PDCCH decoding, all bit fields may be needed to be included in the DCI. Therefore, if gNB intends to schedule UE only with DL assignments worth 1 or 2 HARQ feedback bits (or another size threshold), it may re-use one of the DL DAI fields (e.g. counter DAI) and instead put additional ARI bits on these bit positions in the DCI. When the UE determines, based on the total DAI and received DL assignments, that it only received DL assignments worth 1 or 2 HARQ feedback bits, it decides to interpret one DL DAI bit field (e.g. counter DAI) as ARI bits. Example numbers could be 2 bit each for ARI, counter and total DAI, so with the original ARI field (2 bit) 4 PUCCH resources can be addressed. With combined ARI and one DL DAI field, 4 bit, i.e. 16 PUCCH resources can be addressed. Generally, there may be N bits assigned for assignment indication, which in this example may comprise a counter/current DAI and a total DAI. If the DAI each comprise 2 (3) bits, the assignment indication subpattern may be considered to comprise N=4 (6) bits. If for example, the size indication (in particular according to the total DAI) indicates that the size is below a size threshold like 3 bits or scheduling assignments, the counter DAI part of the assignment indication may be used for resource indication (M2=number of bits of counter DAI, e.g. 2 or 3; M1=number of bits of total DAI, e.g. 2 or 3).

The ARI bits can be used to indicate PUCCH resource sets (or pools) instead of PUCCH resources with each set or pool containing multiple PUCCH resources that may be implicitly chosen based on some criterion such as the CCE index of the PDCCH scheduling the PDSCH for which the ACK/NACK is being transmitted. However, having multiple resource sets being chosen by the ARI is not necessary for all payload sizes. Hence, the ARI or DAI can be re-interpreted to choose between PUCCH resource sets or directly between PUCCH resources, depending on e.g. whether the payload size is 2 bits or less (as indicated by a size indication) or the payload size is greater than 2 bits.

More flexibility can be provided in determining the degree to which explicit (via ARI) and implicit (based on payload size or CCE index etc.) methods are used for PUCCH resource determination. This may be achieved e.g. by the ARI always choosing PUCCH resource sets, but with the number of elements in the PUCCH resource sets varying for different payload sizes.

Example variants are discussed in the following, where it may be assumed that a counter DAI has a size in bits of D1, and the total DAI has a size in bits of D2 (D2 may be equal to D1). An assignment indication comprising both DAIs thus may have a size of D=D1+D2. A subpattern of the control information message using the assignment indication fully may thus have a size of N=D=D1+D2. If one of the DAIs is not used, the subpattern may use N−D1 or D2 (e.g., for repurposing the counter DAI) bits for assignment indication, and D1 bits for resource indication. The D1 bits may be used in combination with R1 bits, which may be included in a subpattern providing additional resource indication bits, e.g. in an ARI field (ARI1).

When the gNB decides to schedule a terminal with just 1 or 2 DL assignments for which HARQ feedback should be included in the same HARQ codebook, the use of counter and total DAI may not be needed. In this case it may be sufficient if the gNB just uses the total DAI. The total DAI is set to either 1 or 2 in this case (likely 00 or 01 in bit notation with D2=2), depending on number of scheduled DL assignments or subject transmissions. The counter DAI (D1 bits) can then be re-purposed as an assignment indication like an ARI, e.g. to supplement an already present ARI subpattern. The DCI might already include an original AIR field, e.g. a field (subpattern) ARI1. In case the counter DAI field is re-purposed to ARI bits, these ARI bits may be referred to as ARI2 bits (corresponding to M2 bits). The total ARI field then becomes ARI=[ARI1, ARI2] (or in other order, or just ARI2 if ARI1 is not included). With ARI1 and ARI2 being 2 bit each, the total ARI becomes 4 bit, enabling selection of 16 PUCCH resources. The number of bits for the assignment indication, however, is reduced accordingly. Thus, of the M bits (=D in the example) of a subpattern comprising the assignment indication having counter DAI and total DA, depending on a size indication indicating the feedback size, either M1=M, M2=0 are used for assignment indication, or M1=M−M2 are used for assignment indication, and M2=D1 are used for resource indication.

The counter DAI may be re-purposed. Alternatively, the total DAI can be re-purposed and the counter DAI remains a counter that counts DL assignments. In some cases, if an UL DAI is used, e.g. in a scheduling grant, for low values of the feedback size indicated by the UL DAI, e.g. lower than 3 (2 or less) or lower than 5, an assignment indication, e.g. comprising counter DAI and total DAI, may be completely repurposed (e.g., M1=0, M2=M=D1+D2).

In above explanation the limit was set to 2 bit. However, other threshold values can be used, too.

FIG. 1 shows an exemplary method in a UE to increase the number of bits used for the ARI.

Alternatively, or additionally, two or more of the counter DAI, the total DAI and the ARI fields may be jointly encoded. For example, the total DAI and the ARI can be jointly encoded in a 4 bit field. Each of the 16 values of the field may correspond to a particular DAI value and a particular ARI value. This provides more flexibility in accommodating cases where the number of PUCCH resources may not be a power of 2, and/or where the number of values that the total DAI can take is not exactly a power of 2. It should be noted that the above is just one example and other joint encoding possibilities are possible as well as per this embodiment. For joint encoding, the different numbers of resources or sets of resources that may be addressed or indicated by the joint encoding may shift according to a number of bits effectively available for such addressing.

When the payload size is small, e.g., 2 bits or less, many UEs can be multiplexed together and the number of PUCCH resources to be indexed may need to be greater than that possible purely based on the ARI. In this case, the few bits available in the ARI field may not be enough to index all the needed PUCCH resources. Here, it is useful to be able choose between a larger set of resources for each UE.

However, having multiple resource sets being chosen by the ARI is not necessary for all payload sizes. For higher payload sizes, the ARI (ARI1) field may be sufficient to choose between PUCCH resources/sets. To address both cases, the ARI may be re-interpreted to choose between PUCCH resource sets when the payload size is 2 bits or less and to choose directly between PUCCH resources when the payload size is greater than 2 bits. This is shown in FIG. 2, showing an approach to interpret the ARI to choose directly between PUCCH resources for higher payload ranges and to re-interpret it to choose between PUCCH resource sets with each set containing multiple PUCCH resources for lower payload ranges. In this example, such re-interpretation is applied only for the lowest payload range.

Generally, implicit resource determination may be used when the payload size is 2 bits or less for a UE, and explicit resource determination otherwise. More flexibility is provided in determining the degree to which explicit (via ARI) and implicit (based on payload size or CCE index etc.) methods are used for PUCCH resource determination. In a variant, this is achieved by the ARI always choosing PUCCH resource sets, but with the number of elements in the PUCCH resource sets varying for different payload sizes. This is shown in FIG. 3, where the number of PUCCH resources in a set is progressively reduced for higher payload ranges with some payload ranges only having one resource per set which effectively is the same as directly choosing PUCCH resources with the ARI.

The RRC configuration of each resource set can have a header which indicates the number of PUCCH resources that are part of the resource set with successive fields including details about the PUCCH resource. Furthermore, implicit methods to choose between the resource sets can be designed to flexibly choose between a variable number of PUCCH resources within a resource set. For example, when the starting CCE index of the PDCCH scheduling the PDSCH for which HARQ feedback is to be sent on the PUCCH is used to implicitly determine the PUCCH resource within a set, the mapping between the starting CCE index and the PUCCH resource could be $$P = \mod(C, N_i)$$

where P is the PUCCH resource, C is the starting CCE index of the PDCCH and N_i is the number of PUCCH resources in resource set i.

Figure 3:
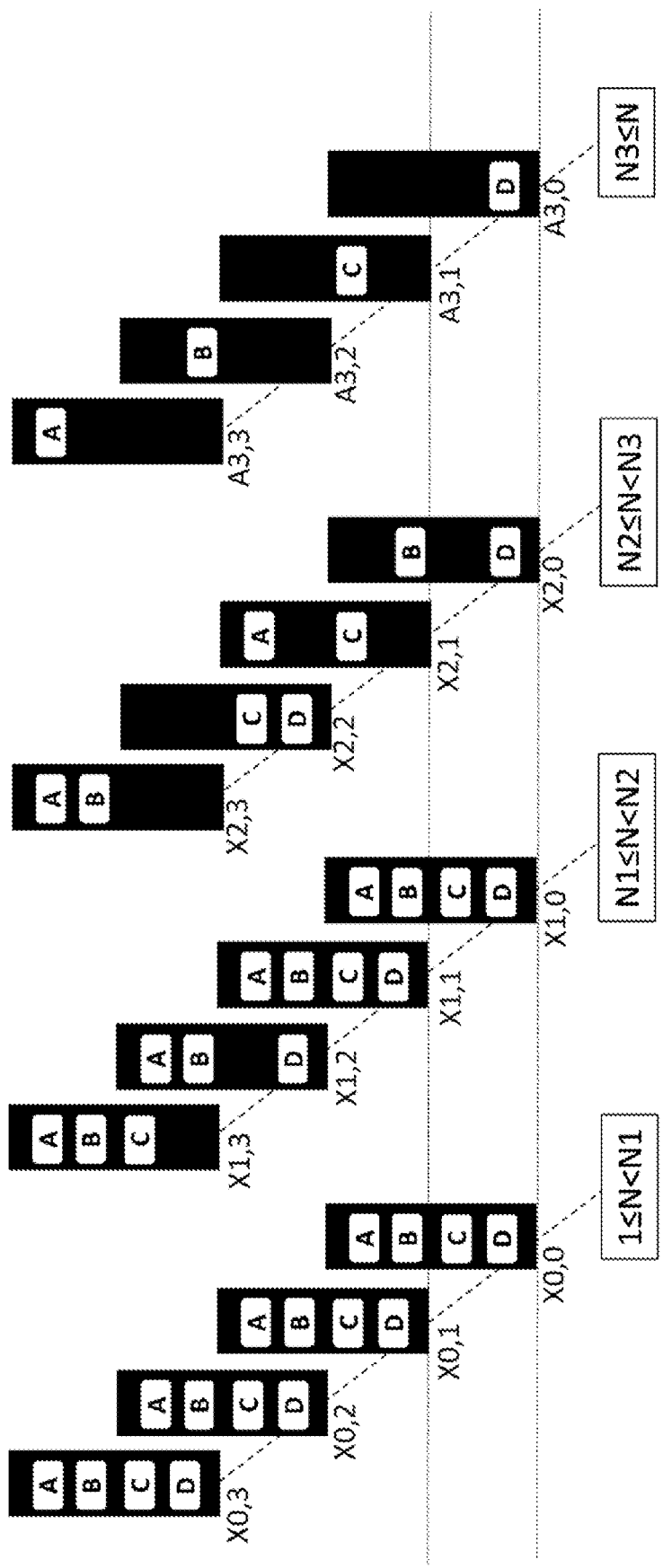
FIG. 3, showing another example of interpreting a resource indication based on a size for feedback signaling.

FIG. 3 shows a method in a UE to interpret the ARI to choose between PUCCH resource sets with each set containing a potentially different number of PUCCH resources. In this example, the number of PUCCH resources in a set is progressively reduced for higher payload ranges with some payload ranges only having one resource per set which effectively is the same as directly choosing PUCCH resources with the ARI.

The advantage of this variant is that the number of PUCCH resources that are reserved for UEs can be scaled more flexibly for different payload ranges while providing greater control in configuring the fraction of resources determined implicitly or explicitly for each payload range. This can be achieved while keeping the DCI overhead the same for the different payload ranges.

The approaches are also applicable to sidelink or backhaul or relay or gNB-gNB communication.

Figure 4:
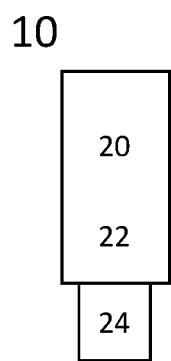
FIG. 4, showing an exemplary radio node implemented as a user equipment.

FIG. 4 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 5:
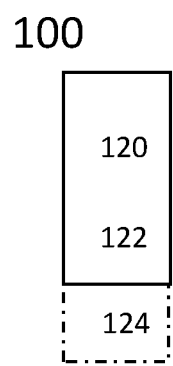
FIG. 5, showing an exemplary radio node implemented as a network node.

FIG. 5 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, and/or indicate quality of service and/or latency and/or data throughput and/or prioritisation, in particular they may indicate a capability to provide such, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or one or more data channel/s. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

Contention-based and/or grant-free transmission and/or access may be based on resource/s that are not specifically scheduled or reserved for the transmission or a specific device (or group of devices in some cases), and/or comprise transmission that is not unambiguously associatable, by the receiver, with a transmitter, e.g. based on the resources used for transmission.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A resource pool generally may indicate and/or comprise resources, in particular time-frequency resources, e.g. time and frequency intervals, which may be contiguous or interrupted, and/or code resources. A resource pool may in particular indicate and/or comprise resource elements and/or resource blocks, e.g. PRBs. A radio node like a user equipment may be considered to be configured with a resource pool if it received corresponding control signaling configuring it therewith. Such control signaling may in particular be transmitted by a receiving radio node as described herein. The control signaling may in particular be higher layer signaling, e.g. MAC and/or RRC signaling, and/or may be semi-static or semi-persistent. In some cases, the responding radio node or user equipment may be considered configured with a resource pool, if it is informed about a corresponding configuration, e.g. that it may access resources in the pool for transmitting. Such a configuration in some cases may be predefined, e.g. based on a standard and/or default configuration. A resource pool may be dedicated to one responding radio node or user equipment, or in some cases shared between several. It may be considered that a resource pool may be general, or for specific types of signaling, e.g. control signaling or data signaling. A transmission resource pool may in particular be for control signaling, e.g. uplink control signaling and/or sidelink control signaling, and/or may be dedicated to the user equipment/responding radio node. It may be considered that a resource pool comprises a plurality of resource structures, which may be arranged in subpools or groups, e.g. pertaining and/or according to type of (received or scheduled) signaling or type of response control signaling. Each group or subpool may comprise a number of resource structures, wherein the number may be representable by an indicator and/or bit field of the selection control information. For example, the maximum number of resource structures in a group may correspond to the maximum number of different values representable by the bit field or indicator. Different groups may have different numbers of resource structures. It may generally be considered that a group comprises a smaller number of resource structures than representable by the indicator or bit field. A resource pool may represent a search space and/or space of availability of resources and/or resource structures available for specific signaling. In particular, a transmission resource pool may be considered to represent a (time/frequency and/or code) domain or space of resources available for response control signaling.

A signaling characteristic may represent resources and/or resource structures in a reception resource pool, which may be different from the transmission resource pool. Resources and/or resource structures representing signaling characteristics of characterising signaling, in particular downlink (or sidelink) control signaling, and/or a corresponding pool, may in particular comprise one or more CORESETs (COntrol REsource SETs), each of which may represent a group or subpool. A CORESET may be associated to a specific time interval, in particular in a transmission timing structure like a slot, e.g. one or more symbols. It may be considered that a first CORESET is configured for the 1, 2, or 3 first symbols in a slot. A second CORESET may be configured for one or more later symbols, e.g. the 5th and/or 6th symbol of the same slot. In this case, the second CORESET may in particular correspond to mini-slot related signaling, e.g. comprise resource structures associated to short (e.g., 1 or 2 symbols) response control signaling, and/or a short latency requirement (e.g., 1 or 2 symbols), and/or received or scheduled transmission in a mini-slot and/or in response to a mini-slot, e.g. mini-slot data signaling. The first CORESET may be associated to slot-based signaling, e.g. long data signaling (e.g., longer than 2, 3 or 4 symbols), and/or response control signaling with relaxed latency requirement (e.g., more than 1 or 2 symbols, and/or allowing transmission in a later transmission timing structure like a later slot or subframe), and/or long response control signaling, e.g. longer than 2 or 3 or 4 symbols. Generally, different CORESETs may be separated in time domain by at least 1 symbol, in particular by 1, 2, 3 or 4 symbols. Depending on which of the groups or subpools, in particular CORESETs, characterising signaling is received, it may be associated to a specific subpool or group of the transmission resource pool. A reception resource pool may be predefined and/or configured to the responding radio node, e.g. by the receiving radio node, which may alternatively or additionally configure the transmission resource pool. Pool configuration may generally be predefined, or performed by the network or a network node (e.g., a receiving radio node), or another responding radio node taking the corresponding functionality and/or also operating as a receiving radio node, e.g. in sidelink communication (in which the configuration may be performed by another UE, or the network/network node).

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers. A resource pool or region or set may generally comprise one or a plurality (in particular, two or a multiple of two larger than two) of resources or resource structures. A resource or resource structure may comprise one or more resource elements (in particular, two or a multiple of two larger than two), or one or more PRBs or PRB groups (in particular, two or a multiple of two larger than two), which may be continuous in frequency. A Control CHannel Element (CCE) may be considered an example of a resource structure, in particular for control signaling, e.g. DCI or SCI.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically. In general, a configuration, in particular the feedback configuration and/or a codebook configuration or a set thereof, may be configured based on one or more messages. Such messages may be associated to different layers, and/or there may be at least one message for dynamical configuration and/or at least one message for semi-static configuration. Different messages may configure different or similar or the same parameter/s and/or setting/s; in some cases, dynamic configuration, e.g. with DCI/SCI signaling, may override semi-static configuration, and/or may indicate a selection from a set of configurations, which may e.g. be predefined and/or configured with higher layer/semi-static configuration. In particular, a configuration like a feedback configuration may be configured with one or more Radio Resource Control (RRC) messages and/or one or more Medium Access Control (MAC) messages and/or one or more Control Information messages, e.g. Downlink Control Information (DCI) messages and/or Sidelink Control Information (SCI) messages.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Transmitting feedback signaling may be based on, and/or comprise, determining feedback information, e.g. one or more bits representing the feedback information. Determining feedback information may comprise performing demodulation and/or error decoding and/or error detection and/or error correction, and/or determining one or more bits of acknowledgement information, e.g. pertaining to the subject transmission, and/or represented by an associated subpattern. Alternatively, or additionally, it may comprise performing measurement/s on the subject transmission, e.g. for demodulation, and/or for providing measurement information and/or for measurement reporting. In some cases, it may comprise determining a scheduling request, and/or providing scheduling-related information, e.g. regarding a buffer status. Transmitting feedback signaling may generally comprise, and/or be based on, determining feedback information, e.g. one or more feedback or ACK/NACK bits. Such determining may comprise performing error decoding, e.g. based on error coding bits, e.g. CRC and/or FEC bits associated to the subject transmission, e.g. data or control information, which may be included in the subject transmission. Error decoding may comprise correcting information, for example based on FEC bits. The error coding bits may be determined based on the information content bits, e.g. utilising an error coding scheme like CRC, and/or polar coding or LDPC coding or Reed Muller coding. The information content may be represented by bits. The information, and in some cases error coding bits associated thereto like error detection bits and/or error correction bits, like CRC and/or FEC bits, may be considered to represent one or more data structures or substructures, for each of which one or more feedback bits, e.g. to indicate ACK or NACK, may be included in the acknowledgement feedback. Thus, at least one bit may be provided for a data structure and/or the whole of the information and/or a message carrying it, and/or one bit may be provided for one or more substructures thereof, to which corresponding error coding may be associated and/or provided, e.g. in the message or signaling. A message may be considered to be similar to a transport block and/or a code block group. One or more acknowledgement process identifiers like a HARQ or ARQ identifier may be associated to the subject transmission. A bit subpattern representing reception (e.g., ACK/NACK or DTX/DRX) may be generally associated to the information in the acknowledgement feedback (acknowledgment feedback may refer to feedback information representing acknowledgement information).

Control information may generally be transmitted in a control message, e.g. on a physical layer or channel, e.g. as a dynamic message like a DCI message or SCI message. A control message may be a command type message, which may comprise, and/or consist of, command type information; or a scheduling type message, which may comprise scheduling information, e.g. scheduling data signaling. Control information may comprise scheduling type control information (or, shorter, scheduling type information), e.g. control information indicating resources and/or transmission parameters for reception of signaling, and/or control information indicating resources and/or transmission parameters for transmission of signaling. The signaling may in particular be data signaling, e.g. on a data channel. Control information may in particular comprise, or consist of, command type control information, and/or be included into a command type message. In general, control information or control message, e.g. DCI or SCI messages, may be distinguished between scheduling type information/messages and command type information/messages. A scheduling type message may schedule transmission on a data channel (data signaling), e.g. for reception or transmission for the target radio node, e.g. in downlink or uplink, respectively. Scheduling grant and scheduling assignment are examples of such scheduling type messages. A command type message may be a message of a different type, e.g., not scheduling transmission on a data channel. A command type message may comprise a set of instructions, which may be configurable or flexible. The instructions may be scheduling-independent. Command type information may for example indicate and/or instruct switching of bandwidth, e.g. to another bandwidth part, and/or activation or deactivation of a carrier and/or cell and/or bandwidth part, and/or activation or deactivation of grant-free transmissions, and/or indications of selection a parameter or configuration out of a set of configured parameters or configurations. In some variants, a command type message may be scheduling independent such that it does not schedule data signaling, or it may have a structure in which such scheduling may be configurable or optional. For the command type, there may be no scheduled transmission based on which reception of the control information may be inferred. It should be noted that scheduling type messages may comprise command type information. Feedback information may be considered a form of control information, in particular UCI or SCI, depending on communication direction or mode. Feedback signaling may be considered a form of control signaling. A control message comprising feedback information may be considered to be of a further type, which may be referred to as feedback type message, which may include a request for resources or in general UCI or UCI-like information in sidelink or backhaul or relay link.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement or substructure of a data element or data block like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/ usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Rate-matching may comprise including the rate-matched information into a bit-stream before encoding and/or modulating, e.g. replacing bits of data. Puncturing may comprise replacing modulated symbols with modulated symbols representing the punctured information.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

Operational conditions may pertain to load of the RAN, or application or use case of transmission or signaling, and/or quality of service (QoS) conditions (or requirements) for a transmission or signaling. QoS may for example pertain to data rate and/or priority and/or latency and/or transmission quality, e.g. BLER or BER. Use for URLLC may be considered a quality of service-related condition.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or a general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat reQuest |
| CAZAC | Constant Amplitude Zero Cross Correlation |
| CBG | Code Block Group |
| CCE | Control Channel Element |
| CDM | Code Division Multiplex |
| CM | Cubic Metric |
| CORESET | Control channel Resource Set |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDD/FDM | Frequency Division Duplex/Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| QoS | Quality of Service |
| RB | Resource Block |
| RNTI | Radio Network Temporary Identifier |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDD/TDM | Time Division Duplex/Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a signaling radio node in a radio access network, the method comprising:
transmitting control signaling to a feedback radio node, the control signaling comprising control information having a bit pattern, the bit pattern comprising a subpattern with M bits, the control information pertaining to feedback signaling, a number M1 of the M bits of the subpattern being assigned to represent an assignment indication, and a number M2 of the M bits of the subpattern is assigned to represent a resource indication, M1 and M2 being determined based on a size indication pertaining to the feedback signaling.

2. The method according to claim 1, wherein the assignment indication comprises at least one of a counter downlink assignment indication and a total downlink assignment indication.

3. The method according to claim 1, wherein M1 and M2 are determined based on a relation between the size indication and a size threshold.

4. The method according to claim 1, wherein, if the size indication indicates a feedback size of 2 or less for the feedback signaling, M2 is determined to be larger than 0.

5. The method according to claim 1, wherein the size indicate by the size indication refers to at least one of:
- a number of bits of the feedback signaling;
- a number of acknowledgement signaling processes;
- a number of one of data structures and substructures; and
- a number of scheduled subject transmissions the feedback signaling pertains to.

6. The method according to claim 1, wherein the control signaling triggers the feedback signaling.

7. The method according to claim 1, wherein M2=0 if the size indication indicates a size over a size threshold.

8. The method according to claim 1, wherein the resource indication indicates at least one of a resource pool and resources within the pool for transmission of the feedback signaling.

9. The method according to claim 1, wherein the bit pattern of the control information comprises at least a second subpattern, wherein the second subpattern comprises an acknowledgement resource indication, that is one of expanded and expandable with M2>0.

10. The method according to claim 1, wherein different values for M2 are determined for different size values indicated by the size indication.

11. A signaling radio node for a radio access network, the signaling radio node being configured to:
transmit control signaling to a feedback radio node, the control signaling comprising control information having a bit pattern, the bit pattern comprising a subpattern with M bits, the control information pertaining to feedback signaling, a number M1 of the M bits of the subpattern being assigned to represent an assignment indication, and a number M2 of the M bits of the subpattern is assigned to represent a resource indication, M1 and M2 being determined based on a size indication pertaining to the feedback signaling.

12. A method of operating a feedback radio node in a radio access network, the method comprising:
transmitting feedback signaling in response to received control signaling, the control signaling comprising control information having a bit pattern, the bit pattern comprising a subpattern with M bits, the control information pertaining to feedback signaling, a number M1 of the M bits of the subpattern being assigned to represent an assignment indication, and a number M2 of the M bits of the subpattern is assigned to represent a resource indication, M1 and M2 being determined based on a size indication pertaining to the feedback signaling.

13. The method according to claim 12, wherein the assignment indication comprises at least one of a counter downlink assignment indication and a total downlink assignment indication.

14. The method according to claim 12, wherein M1 and M2 are determined based on a relation between the size indication and a size threshold.

15. The method according to claim 12, wherein, if the size indication indicates a feedback size of 2 or less for the feedback signaling, M2 is determined to be larger than 0.

16. The method according to claim 12, wherein the size indicate by the size indication refers to at least one of:
- a number of bits of the feedback signaling;
- a number of acknowledgement signaling processes;
- a number of one of data structures and substructures; and
- a number of scheduled subject transmissions the feedback signaling pertains to.

17. The method according to claim 3, wherein the control signaling triggers the feedback signaling.

18. The method according to claim 3, wherein M2=0 if the size indication indicates a size over a size threshold.

19. A feedback radio node for a radio access network, the feedback radio node being configured to:
transmit feedback signaling in response to received control signaling, the control signaling comprising control information having a bit pattern, the bit pattern comprising a subpattern with M bits, the control information pertaining to feedback signaling, a number M1 of the M bits of the subpattern being assigned to represent an assignment indication, and a number M2 of the M bits of the subpattern is assigned to represent a resource indication, M1 and M2 being determined based on a size indication pertaining to the feedback signaling.

20. A non-transitory computer storage medium storing a computer program comprising instructions that, when executed, cause processing circuitry to at least one of control and perform a method of operating a signaling radio node in a radio access network, the method comprising:
transmitting control signaling to a feedback radio node, the control signaling comprising control information having a bit pattern, the bit pattern comprising a subpattern with M bits, the control information pertaining to feedback signaling, a number M1 of the M bits of the subpattern being assigned to represent an assignment indication, and a number M2 of the M bits of the subpattern is assigned to represent a resource indication, M1 and M2 being determined based on a size indication pertaining to the feedback signaling.

* * * * *